INVENTOR.
ROBERT G. ARMSTRONG
BY
ATTORNEY

3,197,602
INDUCTION HEATING CORE
Robert G. Armstrong, Euclid, Ohio, assignor to The Ohio Crankshaft Company, Cleveland, Ohio, a corporation of Ohio
Filed Oct. 26, 1961, Ser. No. 147,906
7 Claims. (Cl. 219—10.67)

This invention relates to the art of induction heating and more particularly to a device for controlling the position of a ferro-magnetic core in the workpiece receiving passage of an induction heating coil.

The present invention is particularly applicable to induction heating of large billets and it will be discussed with particular reference thereto; however, it is to be appreciated that the invention has much broader applications and may be used in a variety of induction heating devices.

In the operation of heating large billets in the workpiece receiving passage of an induction coil, it has become common practice to utilize a ferro-magnetic core which is mounted within the coil passage in slightly spaced relationship with the innermost end of the workpiece to provide even heating of this end. In the past, the core was adjustably spaced from the entrant end of the coil passage a distance determined by the length of the workpiece to be heated and the core was then secured in this position. With this arrangement, various difficulties were encountered. For instance, the position of the core in the coil had to be manually adjusted as the length of successive workpieces was changed. Also, as the workpiece was removed from the coil, the empty space in front of the core was progressively increased which increased the impedance of the coil. This change in the impedance of the coil adversely affected the stability of the current in the induction coil. Another disadvantage was that if the operator did not insert the workpiece the full distance into the coil, then there was an excessive spacing between the end of the workpiece and the core and improper heating resulted.

The present invention relates to a device for correcting the above-mentioned disadvantages and others and which is inexpensive and durable in operation.

In accordance with the present invention there is provided a device for automatically locating a ferro-magnetic core within the workpiece receiving passage of an induction heating coil, which device is comprised of a ferro-magnetic core, a guide means for allowing the core to move axially within the workpiece receiving passage, and a bias means for yieldably exerting a relatively small force on the core tending to move the core into the coil.

In accordance with another aspect of the present invention, the ferro-magnetic core is provided with an axially extending stop or nose on its innermost end to contact and space the workpiece from the end of the core.

The primary object of the present invention is the provision of an apparatus for automatically positioning a ferro-magnetic core in an induction heating coil which apparatus is durable in operation and inexpensive to manufacture.

Another object of the present invention is the provision of a ferro-magnetic core which is automatically positioned within the workpiece receiving passage of an induction coil in accordance with the length of the portion of the workpiece extended into the coil.

Still another object of the present invention is the provision of a ferro-magnetic core which is automatically positioned in the workpiece receiving passage of an induction coil so that the core is continuously spaced the same distance from the end of the workpiece as the workpiece is moved into and out of the coil.

Still a further object of the present invention is the provision of a ferro-magnetic core which is automatically positioned within the workpiece receiving passage of an induction heating coil so that the impedance of the coil does not change substantially as the workpiece is moved into and out of the coil.

Another object of the present invention is the provision of a ferro-magnetic core which is automatically positioned in the workpiece receiving passage of an induction coil so that the core is continuously spaced the same distance from the end of the workpiece as the workpiece is moved into and out of the coil whereby the movement of the workpiece controls the movement of the core.

Still another object of the present invention is the provision of a ferro-magnetic core which is automatically positioned in the workpiece receiving passage of an induction coil so that the core is continuously spaced the same distance from the end of the workpiece as the workpiece is moved into and out of the coil wherein the movement of the workpiece controls the movement of the core and the core is connected to a fluid control device that exerts a force on the core to move the core into contact with the innermost end of the workpiece.

These and other objects and advantages will become apparent from the following description used to illustrate the preferred embodiment of the invention as read in connection with the accompanying drawings in which.

Figure 1:
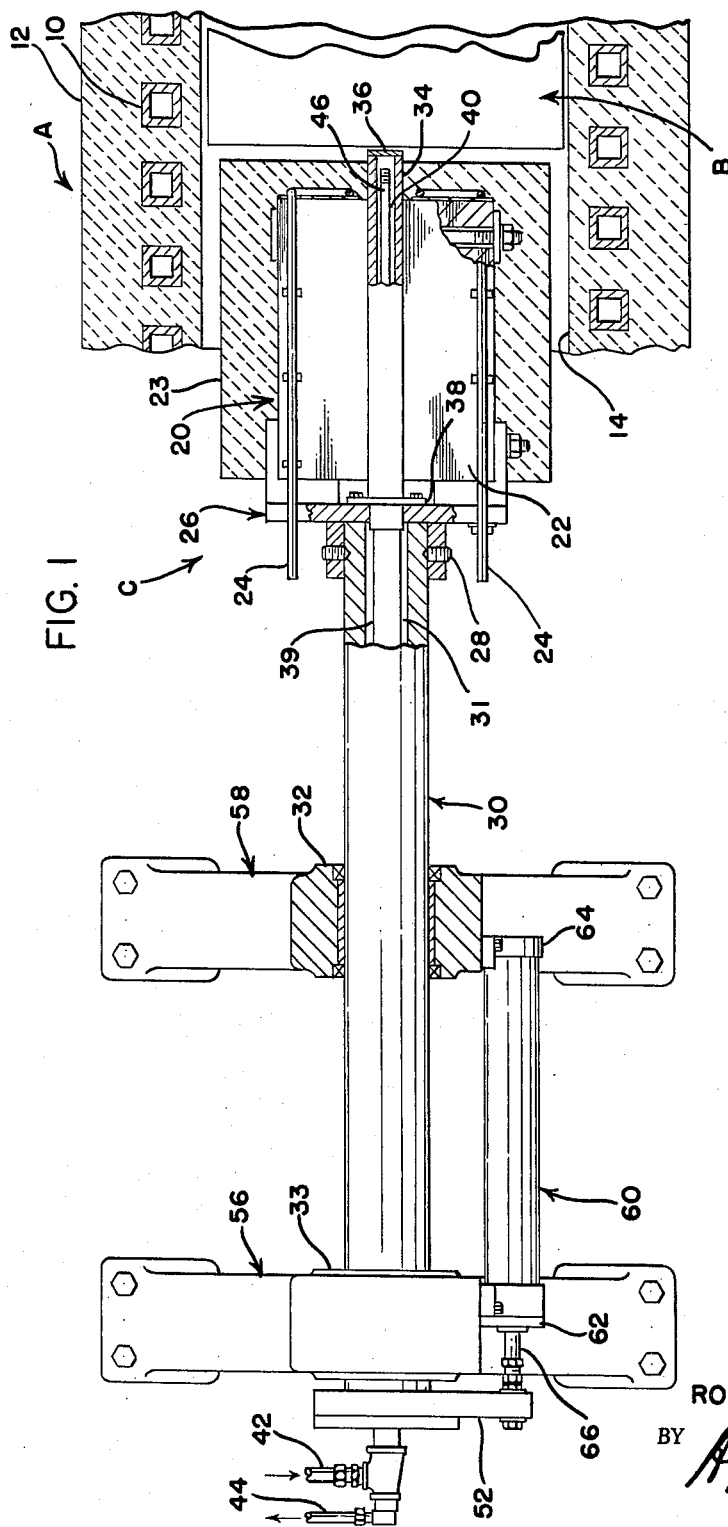
FIGURE 1 is a partially cross-sectioned top view of the preferred embodiment of the present invention.

Referring now to the drawings wherein the showings are for the purpose of illustrating a preferred embodiment of the present invention and not for limiting same, FIGURE 1 shows a conventional induction heating coil A, a workpiece B which in the disclosed embodiment could be a large billet, and an automatically positioned core device C. The particular construction of the coil A forms no part of the present invention; but, it is disclosed in some detail so that the environment of the invention can be adequately appreciated. The coil A, as shown in FIGURE 1, includes a helically wound conductor 10 which, in the preferred embodiment, is represented as being rectangular in cross section and having an internal passage for a cooling fluid, an outer insulating case 12 and an inner axially extending workpiece receiving passage 14 coaxially positioned with respect to the spirally wound conductor 10.

The automatically positioned core device C is rigidly mounted opposite the rear of induction heating coil A so that a ferro-magnetic core 20 may be moved longitudinally through the axially extending workpiece receiving passage 14. Although a variety of constructions could be used for the ferro-magnetic core 20, in the preferred embodiment, the core is comprised of a plurality of soft iron laminations 22 encapsulated within an insulating material 23 and held firmly together by an appropriate support rod 24. The support rod 24 extends rearwardly away from the front end of the coil A and is used to secure the ferro-magnetic core onto an appropriate bracket 26. A plurality of attaching means, illustrated for illustrative purposes only as set screws 28, connect the bracket, and thus the ferro-magnetic core, to a tubular support rod 30 so that the core 20 moves transversely into passage 14 on corresponding movement of the tubular support rod. The support rod is provided with an internal passage 31 and is journaled in appropriate bearing blocks 32, 33 which are coaxially positioned with respect to the axially extending workpiece receiving passage 14. As the support rod 30 moves transversely through the bearing blocks 32, 33, the core 20 moves within passage 14.

Centrally disposed within the ferro-magnetic core 20, there is provided a tubular stop rod 34 which extends both forwardly and rearwardly from core 20. At the forward end of the stop rod there is provided a stop or nose 36 which is spaced slightly from the innermost surface of the core 20 for a purpose to be hereinafter described in detail. The rearward most portion of the stop rod 34 is provided with a flange 38 which is fixedly secured to the bracket 26 so that the stop rod is rigidly mounted with respect to the core 20 and the tubular support rod 30. Beyond the flange 38 the stop rod 34 is connected to a tube 39 so that a cooling fluid passage 40 in the stop rod can be communicated with an appropriate inlet 42 an outlet 44. Cooling fluid is circulated in nose 36 and passes out tube 46 to outlet 44.

Figure 2:
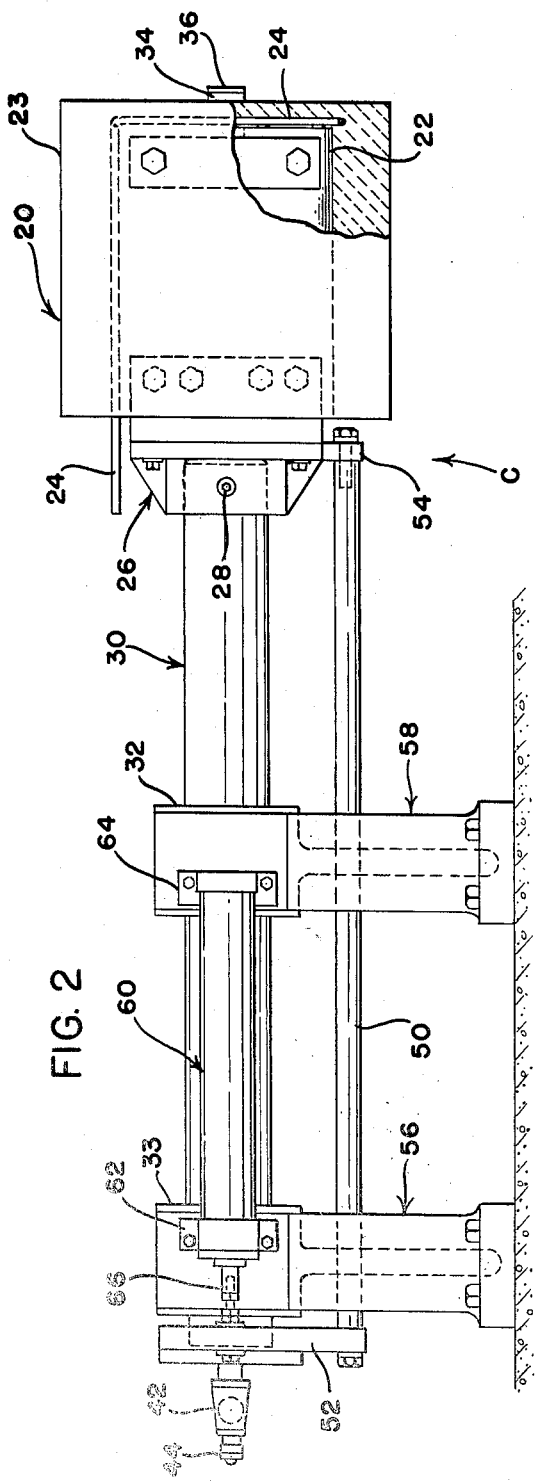
FIGURE 2 is a side view of the preferred embodiment of the present invention.

Referring now to FIGURE 2, the tubular support rod 30 is restrained from rotating within the bearing blocks 32, 34 by an outboard, or laterally offset, guide rod 50 which is slidably received within apertures of frame members 56, 58 that, in the preferred embodiment, serve the ancillary guide purpose of supporting the bearing blocks 32, 33. To join the guide rod 50 with the support rod 30, guide rod 50 is affixed to a bracket 52 connected to one end of the support rod and a bracket 54 connected to the other end of the support rod. It is appreciated that various other arrangements could be provided for allowing only reciprocal movement of support rod 30. Such an arrangement would be a key and keyway incorporated within the bearing blocks 32, 33.

Figure 3:
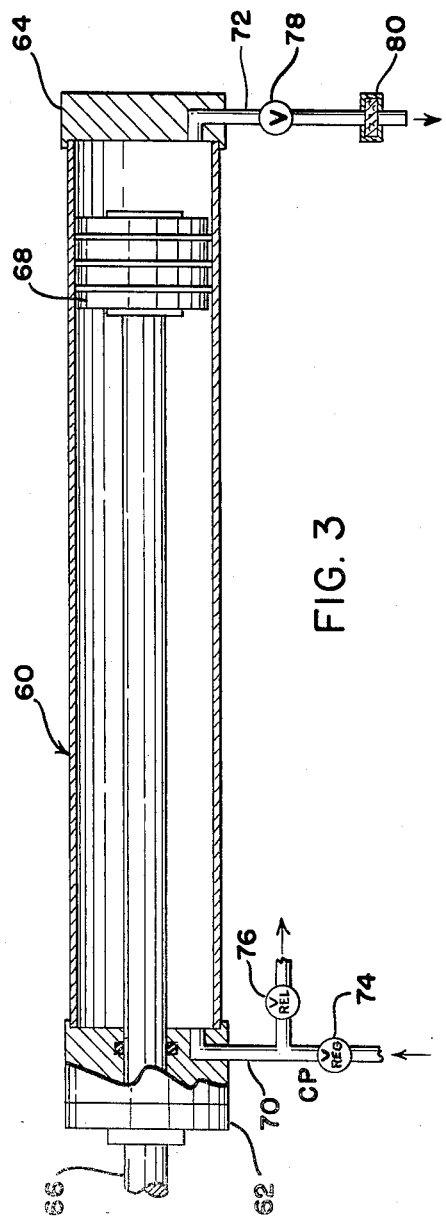
FIGURE 3 is a cross-sectioned enlarged, somewhat schematic, view illustrating the air cylinder used in the preferred embodiment of the present invention.

As so far described, the core 20 is axially movable within the passage 14; however, as the workpiece B is moved into the passage 14, the core 20 could be moved backwardly only and the workpiece could not impart forward movement to the core. To cause the core 20 to move in accordance with the movement of the workpiece B in both a backwardly and a forwardly direction, the movement of tubular support rod 30 is controlled by an outwardly positioned fluid cylinder 60, preferably of the pneumatic type, affixed to frame portions 56, 58, respectively, by appropriate mounting brackets 62, 64. The longitudinal axis of the cylinder 60 is substantially parallel to the sliding axis of support rod 30. As is shown in FIGURE 3, the cylinder 60 is provided with an outwardly extending piston rod 66 connected to the tubular support rod 30 through bracket 52. Within the cylinder 60, the piston rod 66 is affixed to an appropriate piston 68, which piston moves within the cylinder 60 in accordance with the allowed movement of piston rod 66. The cylinder 60 is provided with oppositely positioned fluid control lines 70, 72 which, for illustrative purposes, are illustrated as extending into the cylinder through the brackets 62, 64 respectively. Control line 70 is communicated with a cylinder portion opposite the left end of piston 68 as viewed in FIGURE 3 and is provided with a pressure regulating valve 74 and a pressure release valve 76. The pressure regulating valve 74 introduces a fluid having a preset pressure into the cylinder 60. If the pressure in line 70 increases substantially, the pressure release valve 76 will be opened and the pressure will be diminished to approximately the pressure setting of the regulator valve 74.

The control line 72 is provided with an adjustable bleeder valve 78 which is adjustable to control the flow of air into and out of the portion of the cylinder 60 adjacent the right end of piston 68. To prevent the ingress of foreign matter into the cylinder 60, it is within the contemplation of the present invention to provide an appropriate filter 80 within line 72. The particular arrangement of the valves and filter 80 is schematic and various changes may be made without departing from the scope of the present invention.

The frame members 56, 58 are supported on an appropriate structural portion of the induction heating installation so that the core 20 will have proper sliding movement within the axially extending passage 14. In some heating installations a plurality of induction heating coils are mounted side-by-side. Each of these induction coils may be provided with a separate movable core constructed in accordance with the present invention so that the core of each coil is automatically positioned in accordance with the inwardly extended distance of the workpiece in the separate coils.

In operation, the ferro-magnetic core 20 extends inwardly into the passage 14 an appropriate distance. In practice, the core 20 extends nearly to the outermost position of the passage 14 so that as the workpiece B enters the passage, it contacts the forwardly extending nose 36 of the core. Inward movement of the workpiece B forces the core 20, the hollow support rod 30, and the piston rod 66 backwardly with respect to the coil A. At all times the spacing between the forwardmost end of the core 20 and the rear portion of workpiece B is held constant by the forwardly extending nose 36. As piston rod 66 moves rearwardly, piston 68 is forced toward bracket 62 which increases the pressure in line 70. The increased pressure within the lines 70 opens release valve 76 to prevent a build up in pressure in the cylinder 60. By this valving arrangement, the pressure in the cylinder between bracket 62 and piston 68 remains substantially constant so that the force on piston 66, determined by the cross-sectional area of piston 68 and the substantially constant pressure, does not change appreciably. Thus, the force exerted by workpiece B on core 20 does not increase proportionally to the inward movement of the workpiece as the workpiece is forced further into the passage 14. Since there is a force between the core and the workpiece at all times, the core and the workpiece are maintained in contact irrespective of the position of the workpiece in the passage 14. As the workpiece B is withdrawn from passage 14, the core continues to exert a pressure on the workpiece; therefore, the core follows the workpiece during the outward movement.

The setting of the adjustable bleeder valve 78 determines, to a certain extent, the maximum speed of the core 20. By proper adjustment of this valve the core travels at sufficient speed to remain in contact with the workpiece B as it is being removed from the passage 14.

By providing an induction heating coil with the novel automatically positioned ferro-magnetic core as is contemplated by the present invention, the core is spaced the same distance from the end of the workpiece irrespective of the inward position of the workpiece. This arrangement prevents erratic changes in the impedance of the coil A on insertion and withdrawal of the workpiece, and assures that the core is always spaced the proper distance from the end of the workpiece to provide the proper heating effect on the end of the workpiece.

Although in the preferred embodiment of the present invention it is contemplated to have substantially a constant force being exerted on the ferro-magnetic core irrespective of the inwardly extended distance of the workpiece, it is appreciated that the force on the core may be varied as the workpiece moves further into the coil. However, it has been found that better results are obtained if the force does not increase substantially as the workpiece is moved further into the coil.

Various structural changes may be made in the preferred embodiment as disclosed herein without departing from the scope and spirit of the present invention as defined in the appended claims.

Having thus described my invention, I claim:

1. An apparatus for automatically locating a ferromagnetic core with respect to a workpiece being inserted and removed from the workpiece receiving passage of an induction heating coil, said apparatus comprising, a ferromagnetic core, said core being axially moved in said passage by the workpiece to be heated, a guide means for allowing said core to move axially within said workpiece receiving passage between a first and second axial position, said first position being adjacent one end of said passage and the second position being adjacent an opposite end of said passage, and a second means for yieldably exerting a relatively small force on said core, said force having a relatively constant magnitude as said core moves between said positions and tending to move said core into said coil and maintain said core in contact with said workpiece as said workpiece moves within said coil.

2. An apparatus as defined in claim 1 wherein said second means comprises a fluid cylinder having a piston therein, a rod connected to said piston, means for connecting said rod to said core whereby said rod and said core move in unison, and a source of pressurized fluid to exert a force on said piston, said force on said piston being substantially constant and being directed to said core by said connecting means.

3. An apparatus as defined in claim 2 wherein said source of pressurized fluid comprises a regulator means for maintaining a substantially constant pressure on said piston at all times.

4. An apparatus as defined in claim 1 wherein said core is contacted by the workpiece as said workpiece is moved into said passage, a nose on said core, said nose extending slightly from the innermost end of said core to space said core with respect to said workpiece.

5. An apparatus for automatically locating a ferromagnetic core in the workpiece receiving passage of an induction heating coil comprising, a ferro-magnetic core, a guide means for allowing said core to move axially within said workpiece receiving passage, and a second means for yieldingly exerting a relatively small force on said core, said force tending to move said core into said coil, said second means comprising a fluid cylinder having a piston therein, a rod connected to said piston, said rod connected to said core, and a source of pressurized fluid to exert a force on said piston, said force on said piston being directed to said core by said rod, said source of pressurized fluid comprising a regulator means for maintaining a substantially constant pressure on said piston at all times, and said regulator means comprises a first valve means for directing a supply of fluid at a relatively constant pressure into said cylinder and a second valve means for releasing the pressure in said cylinder as said pressure exceeds a preset value.

6. An apparatus for automatically locating a ferro-magnetic core in the workpiece receiving passage of an induction heating coil comprising, a ferro-magnetic core, a support means for supporting said core coaxially within said workpiece receiving passage, a guide means on said support means for allowing said core to move axially within said passage, a fluid pressure means for yieldably exerting a small relatively constant force on said support means as said core moves axially in said passage, said core adapted to be contacted and moved a workpiece as said workpiece is forced into said passage, said fluid means comprising a fluid cylinder having a piston therein, a rod connected to said piston, and a regulated source of pressurized fluid connected to said cylinder, said source comprising a pressure regulating valve means for directing a supply of fluid at a relatively constant pressure into said cylinder and a release valve means for exhausting the fluid in said cylinder as the pressure of the fluid exceeds a preset value, said preset value being slightly greater than the constant pressure of fluid directed into said cylinder by said pressure regulating valve means.

7. An apparatus for automatically locating a ferromagnetic core with respect to a workpiece being inserted and removed from the workpiece receiving passage of an induction heating coil, said apparatus comprising: a ferromagnetic core, a support means for reciprocally supporting said core coaxially within said workpiece receiving passage, a guide means on said support means for allowing said core to move axially within said passage between a first and a second axial position, said first position being adjacent one end of said passage and said second position being adjacent an opposite end of said passage, a fluid pressure means for yieldably exerting a small, relatively constant force on said support means to maintain contact between said core and said workpiece as said workpiece moves axially within said passage between said first and second positions, said core being moved between said positions by said workpiece as said workpiece is forced into said passage.

References Cited by the Examiner

UNITED STATES PATENTS

| | | | |
|---|---|---|---|
| 2,484,865 | 10/49 | Strickland | 219—10.73 |
| 2,820,128 | 1/58 | McArthur | 219—10.67 |
| 3,065,324 | 11/62 | McNair et al. | 219—10.77 X |
| 3,080,468 | 3/63 | Wuczkowski | 219—10.77 |

RICHARD M. WOOD, *Primary Examiner.*

MAX L. LEVY, *Examiner.*